April 4, 1939.  A. H. JESSEN  2,152,739
VARIABLE SPEED POWER TRANSMISSION DEVICE
Filed July 1, 1936  2 Sheets-Sheet 1
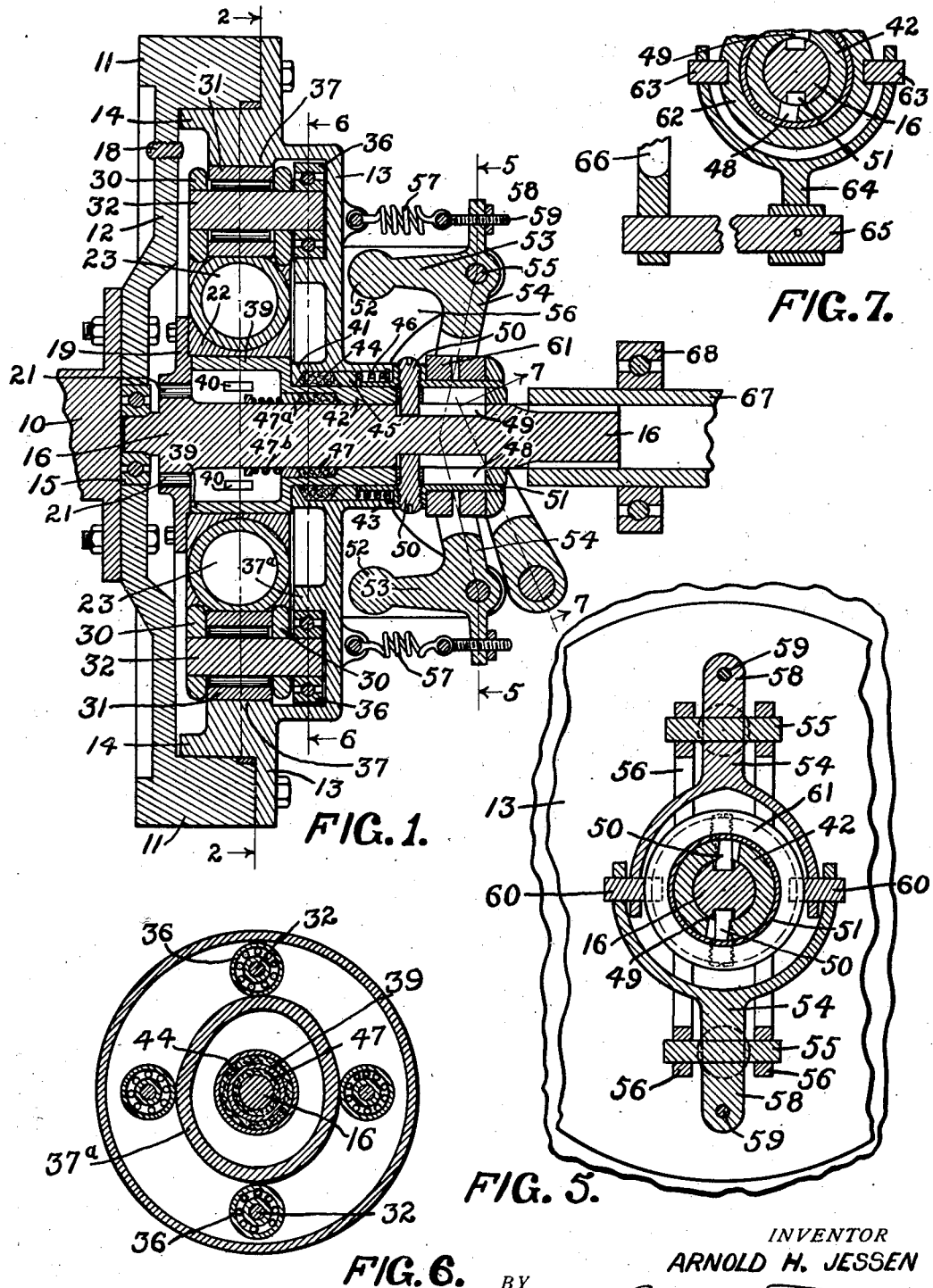
INVENTOR
ARNOLD H. JESSEN
ATTORNEY April 4, 1939. A. H. JESSEN 2,152,739
VARIABLE SPEED POWER TRANSMISSION DEVICE
Filed July 1, 1936 2 Sheets-Sheet 2
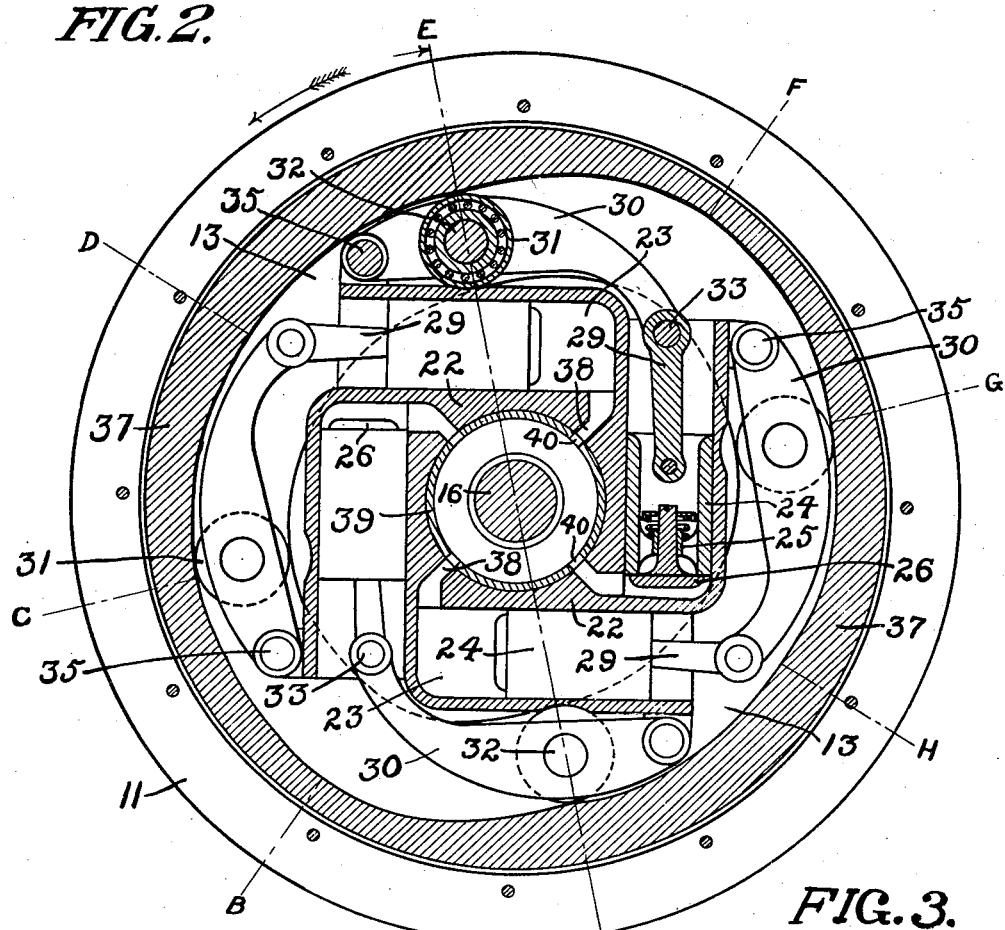
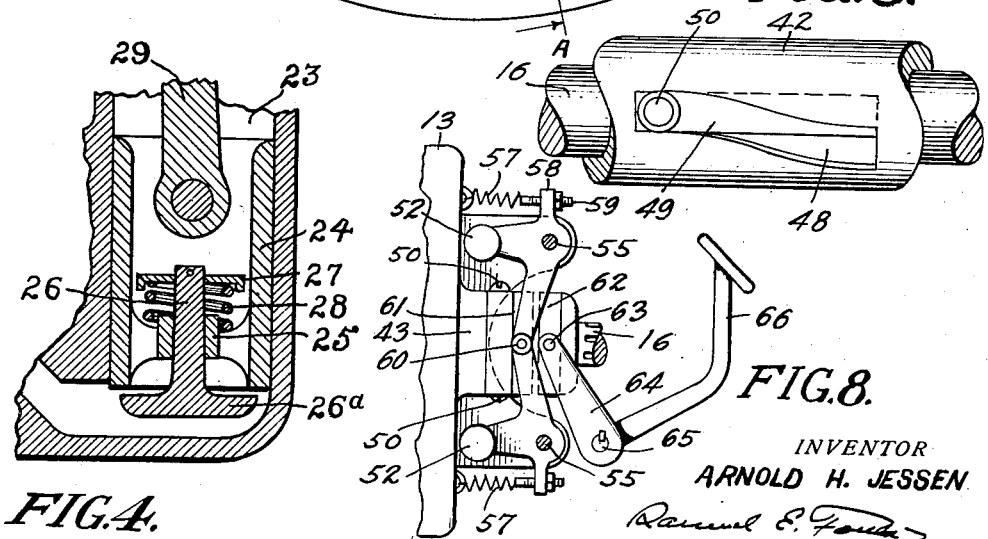
INVENTOR
ARNOLD H. JESSEN
ATTORNEY Patented Apr. 4, 1939

2,152,739

UNITED STATES PATENT OFFICE 2,152,739

VARIABLE SPEED POWER TRANSMISSION DEVICE

Arnold H. Jessen, Los Angeles, Calif.

Application July 1, 1936, Serial No. 88,400

11 Claims. (Cl. 192—60)

This invention relates to devices for transmitting power at variable and controlled speeds from a driving to a driven member. It is an improvement on a device of a somewhat similar nature that is disclosed in my Patent No. 1,336,749, dated April 13, 1920, and it has for its general objects the simplification and increased efficiency of said device. The means by which these and other objects are attained will be specifically set forth hereafter, the preferred form of such means being shown in the accompanying drawings, it being understood that the details shown may be varied without departure from the broad principles of the invention. The subjoined claims are, therefore, not to be considered as limited to said details any farther than their specific terms require.

In the drawings, Fig. 1 is a central section taken through Fig. 2 on the line A—E thereof; Fig. 2 is a vertical section taken on the line 2—2 of Fig. 1, certain parts being shown in elevation; Fig. 3 shows, on a somewhat enlarged scale, a detail of the valve-controlling mechanism; Fig. 4 shows, on an enlarged scale, one of the cylinders of Fig. 2 with its valve open; Fig. 5 is a section through the automatic speed governor, taken on the line 5—5 of Fig. 1; Fig. 6 is a section, on a reduced scale, taken on the line 6—6 of Fig. 1; Fig. 7 is a section on line 7—7 of Fig. 1, and Fig. 8 is an elevational view of the features shown in Fig. 5.

The driving member 10 is rotatable and may be connected with any source of power, as with the crank shaft of an engine. Bolted or otherwise secured to the member 10 is a hollow disk-like structure with a heavy rim 11 and side members 12 and 13. The side 12 is preferably integral with the rim and is attached to the member 10. The side 13 is bolted or otherwise secured to the rim and is centered by means of a flange 14 which extends within the rim. Owing to the weight of the rim, the said hollow structure serves as a flywheel for the driving member; and, since it contains the means for transmitting power, it may appropriately be designated the casing.

In axial alinement with the driving member 10, the side member 12 of the casing is provided with a seat for a roller-bearing 15, within which is journaled the end of the driven member 16, the latter being, in the structure shown, a shaft which projects into the casing through a centrally-positioned aperture in the casing side 13. As will be shown, the casing is made liquid-tight. The liquid, which is preferably oil, may be introduced through an aperture adjacent the rim, as is indicated in Fig. 1, a plug 18 normally closing the aperture.

The driven shaft or member 16 is provided near its inner end with a disk-like flange 19, which is preferably integral with the driven member. Through it extends a plurality of ports 21, for a purpose hereinafter stated. Symmetrically positioned about the shaft 16 and rigidly attached to the flange 19 is what may appropriately be termed the rotor member, 22, the same being provided with a plurality of equi-distantly spaced cylinders 23. In the structure shown there are four of these cylinders, the adjacent cylinders having their axes at right angles to one another. The cylinder walls are preferably integral with one another and with the rotor member 22, as shown. The axes of the cylinders are equidistant from the axis of the rotor element and are tangent to an imaginary circle having the latter axis as a center. Within each cylinder is a reciprocable piston 24, the same being tubular in form and having a spider 25 for guiding the stem 26 of a valve, the latter having a head 26ª which closes against the end of the piston, as shown in Fig. 2, or against a seat therein, while the piston is traveling inwardly on its power stroke, and separates from the piston, as shown in Fig. 4, while the latter is moving outwardly, thus to permit the liquid to pass through the piston. The valve stem is provided with a washer 27 at or adjacent its end. While the valve will naturally close as the piston starts on its active stroke, it is preferably pressed toward its seat by a small coiled spring 28 which surrounds the stem between the spider and washer.

Attached to each of the pistons is a link or pitman 29 which is pivotally connected with an operating lever 30. Each of these levers is made up of a pair of similar members which are spaced apart to receive between them a roller 31, the latter being mounted on roller bearings which are supported by a pin 32 carried by the lever members. The said pair of members which makes up a lever is further connected by the pin 33 to which the pitman 29 is pivoted, and by a pin 35 which projects from the rotor member 22 and serves as the fulcrum of the lever. On the outer or right hand end of the pin 32, as viewed in Fig. 1, is a roller 36, the same turning on roller bearings, as best shown in Fig. 6. Four of the levers 30 are employed, one for each of the cylinders 23, and they are identical in construction. When there is a relative rotative movement between the casing and the inner rotor member, the levers are rocked on their pivot pins 35 to move their respective pistons, thus to pump the oil or other liquid and cause it to circulate in a manner presently to be described. For rocking the levers, I provide a cam 37 which is on the side member 13 within the rim 11 of the casing and turns with it. The rollers 31 contact with the inner irregular face of this cam to move the levers 30 on the power strokes of their pistons. The levers are forced backwardly by the rollers 36 which roll upon an inner cam 37a which is attached to the side 13 of the casing. The cam 37a has substantially the same shape as the cam 37; and, since the rollers 31 and 36 are journaled on the same pins and both roll upon their respective cams, the pistons are moved positively whether on their working or return strokes.

The inner or closed end of each of the cylinders is connected, through a port 38, with a cylindrical chamber within the cylinder member 22 and coaxial with the driven shaft 16. Closely fitting within said chamber, but rotatable therein, is a tubular valve 39, the same having ports 40 which, by turning the valve, are brought into or out of register with the ports 38. If preferred, the chamber may be lined with babbitt, or some similar material, as is obvious. When said ports are fully registered, as in Fig. 2, the liquid can pass freely from the cylinders through the ports and into a cylindrical space within the valve 39 about the shaft 16; and from said space through the ports 21 in the flange 19 to the interior of the casing outside the cylinders to enter again the cylinders when their pistons are returning from their power strokes. Thus is a continuous circulation of the liquid maintained while the ports 38 and 40 are fully or partially open and the driving member 10 and the casing with its cams 37 and 37a are rotating at a speed above that of the rotor member. When the ports are fully open, the circulation is so free that little resistance is offered to the movements of the pistons. Consequently, but little power is transmitted to the driven member 16 and the friction and whatever load may be applied to the latter are usually sufficient to prevent rotation of said member. When, however, the valve 39 is turned partially to close the ports 38 and 40, greater resistance to the movement of the pistons is encountered and more power is transmitted. With a given resistance to overcome, a point will be reached in closing the valve when the power transmitted is sufficient to start the driven member. Thereafter, further closure of the valve results in an increase of power transmitted and a higher speed of rotation of the driven member until, when the valve is fully closed and the circulation of the liquid is prevented, the driven and driving members rotate together as a unit. That is to say, the liquid within the cylinders being substantially incompressible, the pistons cannot move therein and the cam 37 forces the rollers 31 and the entire rotor to turn with it and at the same speed.

As stated, the tubular valve 39 fits within the cylindrical space within the rotor, and it extends from the flange 19 to a flange 41 on the inner side of the side member 13 of the casing. The diameter of the valve is then reduced to fit about the driven shaft 16 and form a sleeve 42 which extends outside the casing. The said side member is provided with an outwardly extending sleeve 43 which is spaced from the sleeve 42 of the valve to leave a space for packing 44. This packing is compressed by a tapered collar 45 which is forced against it by a spring 46 which surrounds the sleeve 42 and is within the sleeve 43. By this means, the liquid is prevented from escaping along the outer surface of the valve sleeve 42. To prevent leakage between said sleeve and the shaft 16, a packing gland 47 is provided, the valve sleeve being recessed to receive it, the recess having a tapered outer wall, as shown. The packing material of this gland is compressed between the tapered wall of the recess of the said sleeve and a collar 47a similarly tapered which surrounds the shaft 16, said collar being pressed outwardly by a spring 47b which abuts against an outstanding bead or collar on the shaft 16.

The valve 39 could be turned to vary the positions of the ports 40 by many kinds of suitable devices, that shown comprising a pair of diametrically opposed curved slots 48 in the outer part of the valve sleeve 42 and correspondingly arranged straight slots 49 in the shaft 16, into which slots project pins 50 which are rigidly connected to a sleeve 51 which encircles and slides upon the said sleeve 42. Any desired number of sets of slots and pins may be employed. The sleeve 51 may be moved back and forth either automatically to maintain a constant speed of rotation of the shaft 16, or manually, as will be described; and when so moved, the valve sleeve 42 and valve 39 are turned, as will be understood.

The automatic means for turning the valve 39 is a centrifugal governor which comprises one or more pairs of balls or weights which are arranged about the shaft 16 and are adapted to be moved outwardly against spring resistance as the speed of the said shaft tends to increase above that desired, said weights being connected with the sleeve 51 in such a manner as to slide it and its pins 50 on the sleeve 42. When thus moved, the pins, which project through the slots 48 and into the slots 49, cause the valve sleeve 42 to turn slightly on the shaft and, in so doing, vary the effective openings through the valve ports 40.

The automatic governor, shown in Figs. 1 and 5, comprises the balls or weights 52 on, and preferably integral with, arms 53 of yoke levers 54 which are pivotally mounted on pins 55, said pins being supported in pairs of brackets 56 which project from the outer face of the casing member 13. The arms 53 and weights 52 are yieldingly impelled toward the shaft 16 by springs 57, the ends of which are respectively connected with the said casing member and arms 58 on the yoke levers 54. The connections with said arms comprise bolts 59, which extend through the respective arms, and nuts on the bolts. This makes it possible to adjust the tension of the springs, as will be understood. Each of the yokes 54 has a pair of divergent arc-shaped arms which partially encircle the sleeve 51 and connect therewith through oppositely extending pins 60 which project from a ring 61 on and about the sleeve. With this arrangement of parts, tensioning of the springs 57 shortens the outward movement of the balls or weights 52 and holds the sleeve 51 farther to the right, as seen in Fig. 1, with the result that the openings of the valve ports 40 are restricted and the speed of rotation of the shaft 16 is increased. If the casing, with its side member 13, speeds up unduly, as because of a lighter load on the engine, and the governor balls 52 spread apart, the valve ports are automatically opened so that the increased speed is not transmitted to the shaft 16 and the latter is not accelerated.

In practice, conditions frequently arise which make it highly desirable or necessary for the operator to take over manual control, or to overrule the centrifugal governor. For that reason, the speed of rotation of the shaft 16 should be under control of the operator also; and, for that reason, I provide the sleeve 51 with another ring 62, from which project a pair of oppositely positioned pins 63 which are engaged by the arc-shaped arms of another yoke 64, which is pinned or otherwise secured to a rock-shaft 65 under control of the operator, as by a foot-pedal, a portion of which is indicated at 66 in Fig. 7.

The outer end of the shaft 16 may be connected in any suitable manner with a driven shaft extension 67 which may be carried in roller bearings, as shown at 68 in Fig. 1.

To make plain one feature of my invention which is now to be described, let it be assumed that the driving member 10 and the casing are rotating at a certain constant speed in the direction of the arrow in Figure 2 and that the driven member with its series of cylinders and pistons in rotating at half that speed. To obtain a steady rotation of the driven member, it is necessary that a constant torque be applied to it; and that means that the liquid must flow through the circulating system at a constant rate. The valve 39 is therefore set and maintained in the proper position for attaining that reduction in speed. But in the structure shown, there are times in the rotation of the driven member when but two of the cylinders are discharging their contents into the circulating stream while at other times all four cylinders are discharging into that stream. When the parts are in the position shown in Fig. 2, only the upper and lower pistons are on their working strokes and are discharging into the stream. The pistons at the right and left are momentarily idle, since their operating rollers 31 are on the high points of the cam at E and A. All the time that these rollers are traveling over arcs E—F and A—B, respectively, the valves of these pistons are open and there is no discharge from them into the circulating stream. When, however, these rollers reach the points F and B, respectively, and continue over the arcs F—G and B—C, the other two rollers are traveling over arcs HA and DE. All of these four arcs are gradually, but slowly, thickening. All four pistons are on their working strokes and are discharging the contents of their cylinders into said stream. If, therefore, the pistons were always moved at the same speed, the torque would fluctuate and the rotation of the driven member would be unsteady. To prevent this undesirable result, the speed with which a piston is advanced on its working stroke must be in inverse ratio to the numbers of pistons which are working at that instant. When all four are advancing, their speed can be only half what it is when but two are working. This variation in piston speed is accomplished by the special shape of the cam 37.

Since four cylinders are employed in the structure shown, the cam is divided into two equal and symmetrical parts. The plane of division of the cam could be extended through the center of Fig. 2 in any direction; but the description may be simplified if it be taken on the section line A—E of Fig. 2. That line cuts through the highest parts of the cam and through the rollers 31 which are on those parts. Consequently the pistons which are operated from those rollers are at the ends of their working strokes and are ready to start their return strokes. Since that half of the cam from A to E, progressing clockwise, is precisely the same as the other half, attention will be directed to the half first mentioned; the cam being assumed to rotate anti-clockwise as indicated by the arrow at the top of Fig. 2. As the roller 31 rolls down the cam from A to B the piston is on its idle or return stroke. From B to E it is on its working stroke. Since all the power is transmitted while on the working stroke, it is desirable that the arc A—B be as short as practicable in order that the working arc, A—E, be correspondingly long. It will be noted that the rollers 31 are carried by their levers 30 near the pivot pins 35 so that a relatively short movement of the rollers produces a much greater movement of the pistons. In the design shown, the piston travels substantially three times as far as the roller moves in and out toward the center. At the instant the point B of the cam reaches the roller 31, which has advanced in the same direction as the cam and half as far, the roller is in the lowest part of the cam and the piston has finished its return stroke. As the cam from B to E passes the roller, the piston must move just as far as it did on its return stroke; and, since the arc B—E is substantially three times as long as the arc A—B, the thickening of the cam can proceed at a rate which is substantially one-third the rate at which it thinned from A to B. But the rate of thickening cannot be uniform, as has been explained. When the two oppositely positioned rollers are moving outwardly over the arcs A—B and E—F and their pistons are on their return strokes, the circulation must be maintained in full volume by the other two pistons whose rollers 31 are then traveling on the arcs C—D and G—H of the cam. At the other arcs, B—C, D—E, F—G and H—A, all four pistons are working. Consequently, from C to D and from G to H, the cam must thicken substantially twice as fast as it does in the other arcs. In a structure which I have designed with very great care and of which Fig. 2 is an illustration, on a reduced scale, the arcs A—B and E—F extend over 45° each and the cam is thinned .4375 inch; the arcs B—C, D—E, F—G and H—A each extend over 43° and the cam thickens .109 inch; the arcs C—D and G—H each cover 49° and the cam thickens .218 inch. A structure made in accordance with this design or with dimensions proportional thereto, gives a substantially uniform flow of liquid with any setting of the valve 39 and at any speed.

While, as stated, the present invention is an improvement upon the device shown in my said Patent No. 1,336,749, it has numerous advantages over that device. Some of these will now be set forth.

In the first place, this invention has the governor which automatically maintains a substantially constant speed of the driven shaft 16 notwithstanding wide variations in the speed of the driving engine or motor. The patented device has no automatic governor. Then, the cam 37 is different from the corresponding cam of the patented device. The number and tangential arrangement of the cylinders and pistons are substantially the same and in both structures the pistons are operated through levers and pitmans. In the patented device, the arc of the cam which may be said to control a piston on its return or idle stroke is equal to the arc which controls the piston on its forward stroke. Each arc extends through 90°. In the present structure, the return arc is but 45° long while the working arc has been increased to extend through 135°, which is a gain of 50% over that of the former cam. That means that the pressure exerted by the cam in transmitting a definite amount of power is diminished, since the cam has more time in which to transmit it; or, if the pressure be the same, a greater amount of power will be transmitted. There is, therefore, a distinct gain made by the use of the present form of cam. Further, the smoothness or steadiness of rotation of the driven shaft is enhanced. In the old structure, with its operating cam divided into four arcs of 90° each and its four operating rollers spaced 90° apart, when two of the oppositely positioned rollers are on the lowest parts of the cam and the corresponding pistons are at the ends of their return stroke the other two rollers are on the thickest parts of the cam. For a moment, short though it may be, no piston is on its operative or power stroke. Two have just completed that stroke and two are just ready to start it. The next instant, two of them will be at work, and the other two will be idle or returning. This momentary shift from a condition of no work to that of full work tends to unsteadiness of rotation of the driven shaft. In the present structure, the operating rollers 31 are 90° apart, as before; but the operating cam 37, with its unequal arcs as previously described, is always forcing two and sometimes all four of the pistons on their power strokes. With the long operating parts of the cam divided into differing arcs in which the rate of thickening of the cam differs, as described, the driven shaft 16 is rotated with substantially perfect smoothness.

A further advantage in the present structure which may be mentioned is due to the positions of the operating rollers 31 on their respective rock levers 30. In the old structure, these rollers were midway between the ends of the levers, and the push exerted by the operating cam was transmitted equally to the said two ends. If the pivoted end were leading or in advance as the rotor turned, the pressure at that end was exerted on that side of the axis of the rotor which made the pressure effective to assist in turning the rotor. In other words, it added to the torque. But that rotative force was completely neutralized by the equal force exerted through the pistons at the opposite ends of the levers, which latter force was acting on the opposite side of the axis and was tending to turn the rotor backwardly. In the present structure, the rollers 31 are relatively near the pivoted ends of the levers. As shown, they are at points which are substantially half as far from the pivoted ends as they are from the piston ends, and practically two-thirds of the push exerted upon them is transmitted to the pivoted ends. Since those ends are leading or in advance, as indicated by the arrow at the top of Fig. 2, the inward force upon the said ends adds powerfully to the torque. The pistons, of course, exert an opposing force; but that force acts twice as far away from the rollers and is only half as great as is the force at the pivoted ends of the levers. This preponderant force is on the side of the axis which makes it effective to turn the rotor in the proper direction. And this arrangement of the rollers 31 on their levers results in another advantage in that the pressure upon the liquid on the working strokes of the pistons is relatively light. When that pressure is very heavy the liquid grows correspondingly hot, deteriorates rapidly and gives rise to serious troubles when the device is continuously used for some time. The relatively light pressure on the liquid in my present invention relieves and, in most cases encountered in practice, removes this trouble.

Another advantage of the structure shown lies in the ease with which it may be assembled and disassembled, if necessary for repairs. The cams 37 and 37ª are directly on the side member 13, and the rotor, including the cylinders, pistons, levers 30, shaft 16, governor, and all the parts which turn with the rotor, are carried by or supported from said side member. All these parts may be assembled on the said member before it is attached to the rim 11. Further, if it should become necessary or desirable to inspect any of the parts within the casing, the side member can be removed, and it will carry with it all of the parts which have been assembled on it. This is important from the standpoints of both the manufacturer and the user.

Having thus described my invention, I claim:

1. In a power transmitting device, a revoluble hollow casing member containing a liquid, a cam within and secured to said member, a rotor member rotatable within said casing member, a valved piston for and within each of said cylinders, a lever for each of said pistons and jointedly connected therewith, each of said levers being pivoted upon said rotor member, a roller for and journaled upon each of said levers between its ends, said rollers contacting with and rolling upon said cam as the casing and rotor members turn at different speeds, whereby the cam causes the levers to rock upon their pivots and the pistons to reciprocate within their respective cylinders, the rollers being journaled upon their levers at points nearer the pivoted ends of the levers than the piston-connected ends, whereby the thrust of the cam upon the rollers is preponderantly sustained by the said pivoted ends of the levers, and the pivots of said levers are in advance of the rollers in the direction of rotation of the rotor member so that the preponderant thrust from the rollers is transmitted to the rotor member at points where it assists in turning the rotor member.

2. A power transmitting device as set forth in claim 1 in which the cylinders are equi-distantly spaced about the axis of the rotor member with the axes of the adjacent cylinders at right angles to one another.

3. A power transmitting device as set forth in claim 1 in which there are four equi-distantly spaced cylinders on the rotor member and in which the cam extends completely about the interior of the casing member and is divided into two identical halves, each half of the cam being subdivided into four arc-shaped parts, three of said parts increasing in thickness and forming a continuous cam surface for moving the pistons on their working strokes and the fourth part diminishing in thickness to permit the pistons to move on their return strokes, the arrangement being such that at least two of the pistons are always on their working strokes.

4. In a power transmitting device, a rotatable hollow casing member containing a liquid, a cam within said member, a rotor member rotatable within said casing member, a plurality of cylinders carried by said rotor member, a valved piston for and within each of said cylinders, a valve element movable within the rotor member, said member and valve element having ports leading from each of the said cylinders and communicating with the interior of the casing member outside the rotor member, means cooperating with the said pistons and the said cam for reciprocating the pistons when the casing and rotor members rotate at different speeds, thus to cause the liquid to circulate and pass through said ports, such means comprising a lever for each of said pistons and jointedly connected therewith, each of said levers being pivoted upon said rotor member, a roller for and journaled upon each of said levers between its ends but nearer the pivoted ends than the piston-connected ends, an automatic speed governor carried by the casing member, connections between said governor and said valve element adapted to move the latter to vary the effective opening of the said ports in accordance with the speed of rotation of the casing member, whereby a constant speed of rotation of the rotor member is normally maintained and manually operative means for overruling the action of the governor to check or stop the rotor member.

5. A power transmitting device as set forth in claim 4 in which the rotor member is provided with a cylindrical chamber at and about its axial center and in which the valve element is a hollow cylinder fitted within said chamber and having its ports extended through its peripheral walls.

6. In a power transmitting device, a rotatable hollow casing member containing a liquid, a cam within said member, a rotor member rotatable within said casing member, said rotor member having a cylindrical chamber at and about its axial center, a plurality of cylinders carried by said rotor member, a valved piston for and within each of said cylinders, a valve element fitted within the said chamber in the rotor member, an extension on said element projecting therefrom through one side of the casing member, the said rotor member and the valve element having registrable ports therein extending from the respective cylinders to the said chamber within the valve element, ports leading from the said valve chamber to the space within the casing member outside the rotor member, means cooperating with the said piston and the said cam for reciprocating the pistons when the casing and rotor members turn at different speeds, thus to circulate the liquid within the casing member through the said ports, said means comprising a lever for each of said pistons and jointedly connected therewith, each of said levers being pivoted upon said rotor member, a roller for and journaled upon each of said levers between its ends but nearer the pivoted ends than the piston-connected ends, a sleeve surrounding the extension of the valve element outside the casing member, an automatic speed governor carried by the casing member, connections between the said governor and said sleeve for moving the latter upon said extension, thus to vary the flow of the liquid through the ports of the valve element in accordance with the speed of rotation of the casing member, whereby the speed of rotation of the rotor member is automatically maintained constant notwithstanding variations in speed of the casing member and manually operative means for overruling the action of the governor to check or stop the rotor member.

7. A power transmitting device as set forth in claim 6 in which the means cooperating with the pistons and cam for reciprocating the piston comprises a rock lever for and connected with each piston, said rock levers being pivoted to the rotor member at their ends which are opposite the piston connections and an anti-friction roller for and journaled on each of said rock levers adjacent the pivoted end of the lever, said rollers contacting with said cam and transmitting the thrust from the cam to the ends of the respective levers, the preponderant part of the transmitted thrust being sustained by the pivoted ends of the levers and delivered to the rotor member at points in advance of the rollers as respects the direction of rotation of the rotor member, whereby said preponderant part of the said thrust assists in turning the rotor member.

8. A power transmitting device as set forth in claim 6 in which the sleeve through which the valve element is moved is provided with means for connecting it with devices for moving the sleeve manually, said devices comprising a yoke connected with the sleeve and manually operated means for moving said yoke, thus to move the sleeve and to turn the valve.

9. A power transmitting device as set forth in claim 6 in which the sleeve through which the valve element is moved is provided with means for connecting it with devices for moving the sleeve manually, said devices comprising a yoke connected with the sleeve, a rock shaft to which the yoke is connected and a foot pedal for rocking the shaft.

10. In a power transmitting device, a rotatable casing containing a liquid and comprising a rim and side members, one of which is detachable, a rotor member within and coaxial with said casing, said rotor member being journaled within the said detachable side member, a plurality of cylinders on said rotor member, a reciprocable piston for and within each of said cylinders, a lever for and pivoted at one of its ends to each of said pistons and, at its other end to the rotor, an anti-friction roller for and journalled upon each of said levers, an annular cam on said detachable side member with which said rollers contact and upon which they roll when the casing and rotor member rotate at different speeds, whereby the said levers are rocked upon their pivots and the pistons are reciprocated, a driven shaft attached to said rotor element and rotatable with it, said shaft extending through the said detachable side member, a valve member surrounding said shaft and having a part fitted for rotation within the rotor member, said part being spaced from the shaft to provide an annular chamber, said cylinders and valve member having ports which lead into said annular chamber and the latter having other ports leading therefrom into the space within the casing, whereby the liquid can be circulated as the pistons reciprocate and means carried by said detachable side members for controlling the said valve, the construction being such that the parts which are on and rotatable with the rotor may be assembled on the said detachable member while it is detached from the other parts of the casing.

11. A power transmitting device as set forth in claim 10 in which the detachable side member is provided with a second annular cam and the said levers are each provided with a roller which contacts said second cam to return the pistons after they have finished their working strokes.

ARNOLD H. JESSEN.